United States Patent [19]
Fortuin et al.

[11] Patent Number: 5,525,694
[45] Date of Patent: Jun. 11, 1996

[54] PROCESS FOR THE PRODUCTION OF A POROUS FILM HAVING HIGH BURSTING STRENGTH

[75] Inventors: Henricus M. Fortuin, Maastricht; Gertrude P. P. Fleischeuer-Nelissen, Limbricht, both of Netherlands

[73] Assignee: DSM N..V, Heerlen, Netherlands

[21] Appl. No.: 287,252

[22] Filed: Aug. 8, 1994

Related U.S. Application Data

[63] Continuation of Ser. No. 997,908, Dec. 29, 1992, abandoned.

[30] Foreign Application Priority Data

Dec. 30, 1991 [NL] Netherlands .......................... 9102189

[51] Int. Cl.$^6$ .......................... C08F 10/02; C08F 110/02
[52] U.S. Cl. .................. 526/348.1; 526/352; 264/288.4; 264/290.2
[58] Field of Search ............................... 526/348.1, 352; 264/288.4, 290.2

[56] References Cited

U.S. PATENT DOCUMENTS

| | | | |
|---|---|---|---|
| 4,600,633 | 7/1986 | Kono et al. | 428/220 |
| 4,824,718 | 4/1989 | Hwang | 428/284 |
| 4,929,303 | 5/1990 | Sheth | 156/209 |

FOREIGN PATENT DOCUMENTS 0283200   9/1988   European Pat. Off. .

*Primary Examiner*—David W. Wu
*Attorney, Agent, or Firm*—Cushman Darby & Cushman

[57] ABSTRACT

Process for the production of a film having improved bursting strength by applying a recessed line pattern to a porous film produced from a solution of polyethene and from which the solvent has been removed, at a temperature below the melting point of the polyethene, and subsequently stretching the film biaxially with a degree of stretching of at least 2 x in each of the two directions, the surface area of the film increasing by at least a factor 8, and a porous film having high bursting strength.

10 Claims, 1 Drawing Sheet

PROCESS FOR THE PRODUCTION OF A POROUS FILM HAVING HIGH BURSTING STRENGTH

This is a continuation of application Ser. No. 07/997,908, filed Dec. 29, 1992, now abandoned.

FIELD OF THE INVENTION

The invention relates to a process for the production of a porous film from polyethene by forming a solution of the polyethene into a film, cooling the resulting film to below the gelling point of the solution, then removing the solvent, giving a solvent-free film having an initial porosity, and biaxially stretching the solvent-free film.

BACKGROUND OF THE INVENTION

A process of this kind is disclosed in EP-A- 378,279, in which a solution of polyethene in decalin is extruded to form a film from which the decalin is removed by evaporation after cooling to below the gelling point of the solution, during which process the solution is converted into a gel. During said evaporation, the shrinkage occurring in the film is prevented. The resulting film from which the solvent has been removed already has an initial porosity of about 30–50% and subsequently even becomes highly porous, with a porosity of greater than 90%, as a result of biaxial stretching.

This known film has the disadvantage that, although the tensile strength has an adequate value, the bursting strength is low. Consequently, the film can only be used to a limited extent in membrane applications, where in many cases a difference in pressure has to be maintained across the film.

SUMMARY AND OBJECTS OF THE INVENTION

The object of the invention is to provide a process for the production of a porous film having an improved bursting strength compared with the film of the prior art.

This object is achieved, according to the invention, in that a pattern of recessed lines is applied to the solvent-free film before stretching, by exerting a pressure of 1–25 MPa at a temperature below the melting point of polyethene at the place where the pattern is to be applied.

DETAILED DESCRIPTION OF THE INVENTION

Figure 1:
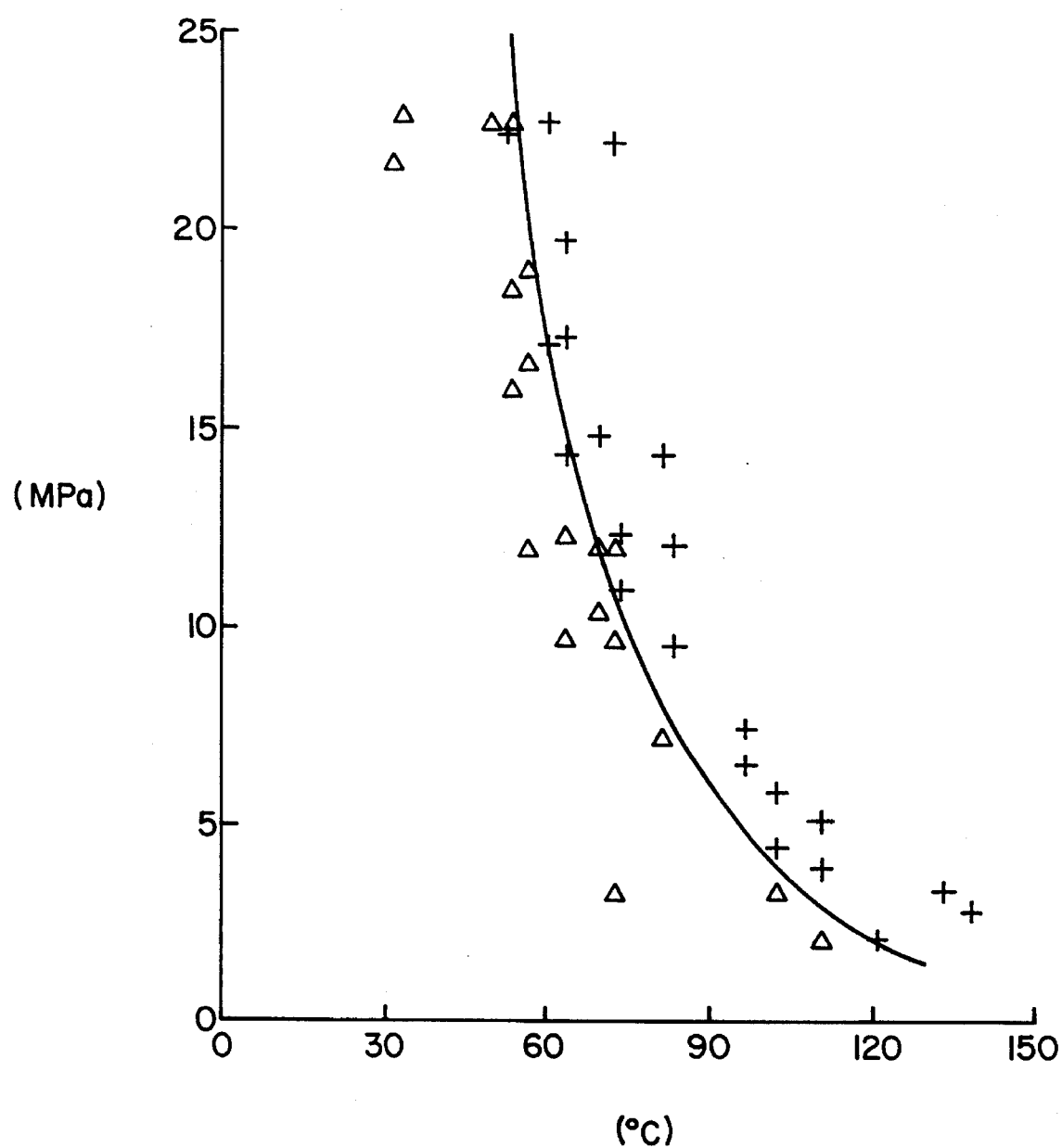
FIG. 1 graphically depicts stretching behavior for polyethylene films having a non-porous line pattern which were stretched 4×4 times.

The films according to the present invention include a pattern of recessed lines in a surface thereof. The lines can be applied to the solvent-free film before stretching by applying a presssure of 1–25 MPa at a temperature which is below the melting point of polyethylene at the place where the pattern is to be applied. Films having a useful bursting strength, such as from about 125 kPa to about 181 kPa, are obtainable.

The resulting film appears to withstand an appreciably greater pressure than the film of the prior art. Surprisingly, the lines in the pattern appear to hardly stretch in their widthwise direction, whereas in the lengthwise direction they fully adopt the stretching to which the film is subjected. Therefore, the lines are stretched substantially uniaxially, i.e. in one direction, although the film is being stretched biaxially, i.e in two directions. This has the additional advantage that the tensile strength of the lines in their lengthwise direction is considerably greater than that of the intermediate porous portions, as a result of which the film in its entirety is also better able to withstand the tensile forces to which it is subjected than the film of the prior art. The fact that the lines do not widen, or hardly widen, has the additional advantage that the applied non-porous line pattern in the stretched film only takes up a very small surface area compared with the porous portions of the film which have indeed been stretched in two directions. As a result, the average porosity of the film and the associated properties of the film, such as air and water vapour permeability, are not substantially different from those of the film of the prior art. The film according to the invention is therefore extremely suitably for membrane applications.

The difference as described in stretching behaviour between the compressed, relatively thin portions and the relatively thick portions results in a thickness difference factor of only 2–3 in the stretched film.

Application of a pattern having different thicknesses in order to improve the mechanical properties of a film has per se been carried out before. Thus, in EP-A- 283,200 a polyolefin filled with an inorganic substance is extruded in the molten state to form a film and guided over a cooling roller covered with projections, as a result of which the film is provided with a pattern of relatively thick and relatively thin sections directly after it has been formed and while it is still in the molten state. During the subsequent stretching, the relatively thin, recessed portions are subjected to a greater degree of stretching than the relatively thick, reinforcing ribs, so that considerable differences in thickness occur between the ribs and the intermediate portions. The film is not yet porous when the pattern is being applied and the porosity arises during stretching as a result of the presence of the inorganic substance. The said patent application does not relate to non-filled and already porous films which are prepared from a solution and does not teach anything in this respect. Neither does the said application give any details about the pattern to be applied. In addition, it is known, for example from JP-A-51/109,970, to apply thickened ribs on a melt-extruded film of thermoplastic material for the reinforcement of relatively thick non-porous films, for example agricultural film. Stretching of the film then takes place at a temperature below the temperature at which the ribs have been applied. The examples show that the ribs do not take part in the stretching and that thickness difference factors of more than 10 occur between the various portions in the film.

The production of porous films by stretching films produced from a solution of polyethene is known for example from the abovementioned application EP-A-378,279, which is considered to be incorporated in its entirety in this description, and from EP-A-160,551. In these processes, as well as in the process according to the invention, preference is given to polyethene having a high molecular weight, for example having an intrinsic viscosity of at least 5 dl/g. In these and other similar processes, solvent-containing films which are not stretched, or only stretched to a very low degree, are formed as intermediate product. By further removing from these intermediate products any solvent still present by means of evaporation or extraction, solvent-free films are formed which already have a certain initial porosity and to which a line pattern can be applied using the characterising steps of the process according to the invention. When the recessed line pattern is being applied, the film may still contain a small amount, for example not more than 5% by weight, of solvent. In the context of the process according to the invention, a solvent-free film is therefore understood to be a film in which not more than 5% by weight of solvent is still present. Preferably, the film contains not more than 3% by weight and most preferably not more than 1% by weight of solvent when the line pattern is being applied.

During stretching of the solvent-free film, its porosity increases. In order to obtain a high-porosity stretched film it is advantageous to start from a film having a high initial porosity. The initial porosity of the film should be at least 10% since the porosity of the stretched film would otherwise be too low for most of the applications of thin porous films. Preferably the initial porosity is at least 15%, more preferably at least 25% and most preferably at least 35%.

The process according to the invention can also be applied to films which have been produced from polyethene by means of processes other than those mentioned above, provided they have a suitable initial porosity.

A pattern is applied to the solvent-free film before stretching by locally exerting a pressure on the film at a certain temperature, referred to as the pressing temperature below, and for a certain time, referred to as the pressing time below. The pressing temperature must remain below the melting point of the polyethene, $T_m$. Preferably the pressing temperature is between $T_m$ and $T_m-85°$ C. A pattern which is applied at a temperature lower than $T_m-85°$ C. is found to disappear during the subsequent stretching and does not contribute to an improvement in the bursting strength. The stretchability of a pattern which is applied at a temperature higher than the melting point of polyethene was found to decline rapidly with increasing pressing temperature, which constitutes a limitation for the maximum degree of stretching of the film and thus for the achievable thickness and porosity of the film. The pattern is preferably applied at a temperature below the stretching temperature which it is to be applied later. The pressure applied should be chosen between 1 and 25 MPa. The pressing time is between 1 and 60 seconds and preferably between 5 and 30 seconds. By pressing the film, its porosity is reduced locally, and the pressure and temperature are preferably chosen within the given limits such that the porosity of the compressed areas of the film is not greater than 5%, preferably not greater than 3% and more preferably not greater than 1%. If said porosity is greater than 5%, the lines of the pattern are found to also stretch in the widthwise direction and the film produced according to the invention possesses the abovementioned advantages only to a lesser degree.

The application of the recessed line pattern may be effected by processes which are known per se for this purpose, for example by feeding the solvent-free film between heatable rollers which can be adjusted to the desired separation and pressure, protrusions for the desired pattern being provided on one of the rollers.

The pattern preferably consists of intersecting lines, by means of which the film surface is divided into sections, bounded by lines of the pattern. In order to obtain uniform properties over the entire surface area of the film, it is advantageous to apply a regular line pattern. A simple regular pattern which, at the same time, is very effective consists of two groups of lines, the lines in each group being mutually parallel or virtually parallel and the lines in the one group running at an angle to the lines of the other group. Both groups can be applied to the same side of the film, but it is also possible to apply one group to each of the two sides, top and bottom side, of the film. The parallel lines are preferably straight, but may also be curved or undulating. Surprisingly, it has been found that an optimum improvement in the bursting strength is achieved when the lines of the first group run substantially at an angle of not greater than 45° measured in the clockwise direction with respect to the extrusion direction of the film and the lines of the second group run substantially at an angle of not greater than 45° measured in the anti-clockwise direction with respect to the extrusion direction, and the directions in which the film is stretched coincide with the extrusion direction (referred to below as MD or Machine Direction) and the direction at right angles thereto (referred to below as TD or Transverse Direction). The two angles mentioned are preferably 10°–45° and they are also preferably equal since in that case a film having more isotropic properties is obtained. Films in which the angles mentioned are less than 10° are more liable to cracks in the MD after stretching.

In order to obtain sufficiently high porosity as well as adequate strength in the lines of the applied pattern, the film must be stretched in two directions at right angles to each other in the plane of the film with a degree of stretching of at least 2 x in each of the two directions, the surface area of the film becoming at least 8 x greater, and preferably at least 3 x and more preferably at least 5 x greater in each of the two stretching directions.

The combination of the strength of the lines in the stretched line pattern and the width of the lines to a great degree determines the forces which the stretched film can withstand. Depending on the use, the width of the lines may be between 0.1 and 10 mm, but a film produced using the process according to the invention appears to already have a considerably improved bursting strength if the width of the lines is between 0.5 and 5 mm.

The final size of the sections bounded by lines from the line pattern in the stretched film is determined by the degree of stretching in combination with the distances between the lines in the pattern as it is applied to the film from which the solvent has been removed. It is advantageous for the bursting strength if a small size is chosen for the sections. On the other hand, the smaller the sections bounded by the line pattern and the wider the lines, the larger the proportion of the total film surface area taken up by the surface area of the non-porous line pattern, and consequently the average porosity over the entire surface area and the associated permeability properties of the film decrease. In practice, the required width of the lines can easily be determined on the basis of the requirements associated with the intended use, and the distance between the lines in the pattern to be applied in relation to the stretching to be applied can be determined in relation to the desired size of the sections and the desired proportion of the porous area of the stretched film in the total surface area. Suitable films are obtained when the interspace between the lines, which run substantially in the same direction, is between 0.5 and 50 mm and preferably between 4 and 40 mm.

The films produced using the process according to the invention possess a combination of permeability properties and bursting strength which was not known until now. The invention therefore also relates to a porous film having a water vapour permeability of at least 10,000 g/(24 h.m$^2$), a higher air permeability than that which corresponds to a Gurley value of 30 s/50 ml and a self-supported bursting strength of at least 125 kPa. The film preferably has a higher air permeability than that which corresponds to a Gurley value of 20 s/50 ml and/or a self-supported bursting strength of at least 150 kPa.

The invention will be illustrated by means of the following examples without, however, being restricted thereto.

The variables mentioned in the examples have been determined as described below.

The tensile strength is determined on a tensile strength tester, analogously to ASTM standard D882-83 using a test specimen having a width of 2 mm and a clamped length of 25 mm. The stretching rate is 25 mm/min.

The water vapour permeability is determined as the moisture vapour transmission rate (MVTR) in g/24 h.m$^2$ in accordance with ASTM standard E96-66BW at a temperature of 23° C., 50% relative humidity and an air flow speed of 2 m/s.

The air permeability is determined in s/50 ml as the Gurley value according to ASTM standard D726-58 using a measuring surface area of 6.45 cm$^2$ (1 square inch) under a load of 567 grams.

The thickness of the films is determined using a Millitron Feinprüf meter, the radius of curvature of the sensor thereof being 12 mm.

The density of the film is determined by determining the weight of a piece of film of known volume. The porosity is determined from the measured density ρ and the density of the polyolefin bulk material $ρ_0$ as:

$$\text{porosity} = \frac{ρ_0 - ρ}{ρ_0} \times 100\%.$$

The self-supported bursting strength is measured using a set-up which is normally used to determine the pressure at which a porous film starts to become permeable to water. The wire mesh which normally serves for supporting the film is removed so that the entire force which is applied is absorbed by the film. Said set-up comprises a vertically mounted round tube having a cross-sectional area of 17.3 cm$^2$, the lowermost aperture of which tube is closed off by the porous film which is to be tested, onto which film a layer of 10 cm water has been applied. The outside of the film is under atmospheric pressure. The upper side of the tube is then closed off and the pressure in the tube is increased until the film breaks. The excess pressure at which the self-supporting film breaks is referred to as the self-supported bursting strength.

The intrinsic viscosity is determined in decalin at 135° C.

The Mullen bursting strength is determined in accordance with ASTM standard D774 using a measuring surface area of 7.29 cm$^2$ and a pressure increase rate of 95 ml/min.

EXAMPLE I AND COMPARATIVE EXPERIMENT A

According to the process described in EP-A-378,279, a solvent-free porous film is produced from polyethene having an intrinsic viscosity of 15.5 dl/g and a thickness of 550 μm. The melting point of this polyethene is approximately 137° C. A recessed pattern is applied to the resulting film, which has a porosity of 35%, by means of a rolling machine which has a smooth roller and a profiled roller at a temperature of 125° C. and a pressure of 15 MPa. The pattern comprises lines which intersect at an angle of 90°, each line being at an angle of 45° with respect to the extrusion direction of the film. The interspace between the lines is 1.5 mm. The film to which the pattern has been applied is stretched simultaneously in two directions 4×4 times at 120° C. on an Iwamoto stretching frame. The properties of the stretched film are given in Table 1 under "Example I". In addition, the corresponding data of a porous film produced in an analogous manner but without a pattern are summarised in Table 1 under "Comp. Exp. A".

TABLE 1

|  | Example I | Comp. Exp. A |
| --- | --- | --- |
| Degree of stretching [MD × TD] | 4 × 4 | 4 × 4 |
| Thickness of porous section [μm] | 45 | 45 |
| Thickness of line pattern [μm] | 80 | — |
| Porosity [%] | 77 | 84 |
| MVTR [g/m$^2$ *24 h] | 12900 | 13500 |
| Gurley value [s/50 ml] | 20 | 8 |
| Self-supp. bursting strength[kPa] | 177 | 98 |
| Mullen bursting strength [kPa] | 290 | 120 |

The bursting strength was found to increase by a factor of approximately 2 as a result of the presence of the line pattern.

EXAMPLE II AND COMPARATIVE EXPERIMENT B

Example I and Comparative Experiment A are repeated, but in this case stretching is first carried out in the extrusion direction (MD) and subsequently in the direction transverse thereto (TD). The results are given in Table 2.

TABLE 2

|  | Example II | Comp. Exp. B |
| --- | --- | --- |
| Degree of stretching [MD × TD] | 4 × 4 | 4 × 4 |
| Thickness of porous section [μm] | 45 | 45 |
| Thickness of line pattern [μm] | 80 | — |
| Porosity [%] | 80 | 86 |
| MVTR [g/m$^2$ *24 h] | 12700 | 13700 |
| Gurley value [s/50 ml] | 15.7 | 5 |
| Self-supp. bursting strength[kPa] | 181 | 88 |
| Mullen bursting strength [kPa] | 285 | 100 |

The bursting strength was found to increase by a factor of approximately 2 as a result of the presence of the line pattern.

EXAMPLE III

Example I is repeated, but in this case, the degree of stretching is 6×6. The results are given in Table 3.

TABLE 3

|  | Example III |
| --- | --- |
| Degree of stretching [MD × TD] | 6 × 6 |
| Thickness of porous section [μm] | 33 |
| Thickness of line pattern [μm] | 52 |
| Porosity [%] | 72 |
| MVTR [g/m$^2$ *24 h] | 11500 |
| Gurley value [s/50 ml] | 12 |
| Self-supp. bursting strength[kPa] | 127.5 |
| Mullen bursting strength [kPa] | 195 |

EXAMPLE IV

The effect of the direction in which the line pattern is applied is investigated. For this purpose, a pattern of parallel lines having a width of 1 mm is applied to films produced as described in Example I at angles of 0°, 30°, 60° and 90°, respectively, to the extrusion direction (MD). The films are first stretched to 4x in the MD and then to 4x in the TD. Strips having a width of 2 mm and a length of 50 mm are cut from the stretched films, each strip having in its centre a line from the pattern in the longitudinal direction. The strips are subjected to a tensile-strength test at a clamped length of 25 mm. The force at which the strip breaks is given in Table 4 under MD/TD. The experiment is repeated, but in this case stretching is carried out simultaneously in both directions (Table 4 under "simultaneous"). For comparison, the forces applying to the 2 mm wide film strips which do not have a line from the pattern and are cut out in corresponding directions have also been listed under "blank".

TABLE 4

| Angle of lines rel. to MD | Force at breakage in N | | |
|---|---|---|---|
| | MD/TD | simultaneous | blank |
| 0° | 17.5 | 16.5 | 4.5 |
| 30° | 16.0 | — | 3.0 |
| 45° | 14.7 | 13.5 | 3.5 |
| 60° | 11.0 | — | 3.5 |
| 90° | 7.6 | 6.5 | 3.0 |

—: not determined

The differences in force at breakage illustrate the effect of the presence of a line applied using the process according to the invention.

EXAMPLE V

A line pattern is applied to films produced as described in Example I under different pressures and at different temperatures. The pressing time is in each case 10 seconds. The films provided with a line pattern are each stretched simultaneously 4×4 times and the stretching behaviour of the line pattern is observed. The results are given in FIG. 1. In this figure, Δ denotes the combinations of temperature and pressure where the lines visibly widen during stretching and do not build up sufficient strength, and + denotes the combinations where no visible widening occurs and the strength of the lines does increase considerably.

This example shows that combinations of the minimum pressure and pressing temperature and pressing time required to obtain an adequate line pattern can easily be determined by experiment.

We claim:

1. A porous polyethylene film obtained by
   (a) forming a solution of the polyethylene into a film containing a solvent;
   (b) cooling the resulting film to below the gelling point of the solution;
   (c) removing the solvent to yield a solvent-free film having an initial porosity;
   (d) applying a pattern of recessed non-porous lines to the solvent-free film by exerting a pressure of between 1 to 25 MPa at a temperature below the melting point of the polyethylene (Tm) at a place where the pattern is to be applied to the solvent-free film; and
   (e) biaxially stretching the solvent-free film.

2. A porous polyethylene film according to claim 1, wherein in step (d) the temperature is between Tm and Tm–85° C.

3. A porous polyethylene film according to claim 1, wherein in step (d) the recessed lines have a width 0.5 to 5 mm.

4. A porous polyethylene film according to claim 1, wherein the surface area of the line pattern in the biaxially stretched polyethylene film is less than 25% of the total surface area of the stretched polyethylene film.

5. A porous polyethylene film according to claim 1, wherein the pattern of recessed lines obtained in step (d) consists of a first group of lines and a second group of lines, wherein the lines in said first group are parallel to each other, the lines in said second group of lines are parallel to each other, and the lines in said first group of lines intersect the lines in said second group of lines.

6. A porous polyethylene film according to claim 1, wherein the film is obtained by extrusion and the pattern of lines comprises a first group of lines running at an angle of not greater than 45° measured in the clockwise direction with respect to the extrusion direction of the film and a second group of lines running at an angle of not greater than 45° measured in the counter-clockwise direction with respect to the extrusion direction, and the directions in which the film is stretched coincide with the extrusion direction and a direction perpendicular thereto in the plane of the film.

7. A porous polyethylene film having two groups of lines in a surface thereof which film is obtained by extrusion and subsequent stretching, said film having a bursting strength of between about 125 kPa and about 181 kPa, a water vapor permeability of between about 10,000 g/(24 h.m$^2$) and about 12,900 g/(24 h.m$^2$), an air permeability of between that which corresponds to a Gurley value of 30 s/50 ml and 12 s/50 ml, wherein said surface of said film has a first and a second group of non-porous lines impressed therein before said film is stretched, the impressing being conducted at a pressure of about 1 MPa to about 25 MPa, the lines within a group of lines being parallel to each other, said first group of lines being at an angle of 10° to 45° measured in the clockwise direction relative to the direction in which the film was extruded, and the second group of lines being at an angle of 10° to 45° measured in the counter-clockwise direction relative to the direction in which the film was extruded, and wherein the stretching occurs in a first direction coinciding with the direction at which the film was extruded and in a second direction in the plane of the film which is at right angles to the extrusion direction.

8. A porous film having a pattern of recessed non-porous lines and produced from polyethylene having a water vapor permeability of between 10,000 and 12,000 g/(24 h.m$^2$) and air permeability of between that which corresponds to a Gurley value of 30 s/50 ml and 12 s/50 ml and a self-supported bursting strength of at least 125 kPa to 181 kPa.

9. A porous film according to claim 8, wherein said film has an air permeability greater than that which corresponds to a Gurley value of 20 s/50 ml.

10. A porous film according to claim 8, wherein said film has a self-supported bursting strength of at least 150 kPa.

* * * * *